United States Patent [19]
Goss

[11] Patent Number: 5,199,837
[45] Date of Patent: Apr. 6, 1993

[54] ULTRASONIC INSERT STUD AND METHOD OF ASSEMBLY

[75] Inventor: David Goss, Rockford, Ill.

[73] Assignee: Textron Inc., Providence, R.I.

[21] Appl. No.: 777,741

[22] Filed: Oct. 16, 1991

[51] Int. Cl.$^5$ ............................................. F16B 39/00
[52] U.S. Cl. ..................................... 411/107; 411/377
[58] Field of Search .................... 411/84, 85, 377, 82, 411/107, 378, 258, 373, 429, 966, 116, 111, 113, 121, 399

[56] References Cited

U.S. PATENT DOCUMENTS

| | | | |
|---|---|---|---|
| D. 294,676 | 3/1988 | Egner et al. | D8/387 |
| 2,272,552 | 2/1942 | Field | 411/271 |
| 2,347,219 | 4/1944 | Schnell | 411/107 X |
| 2,850,934 | 9/1958 | Sehn | 411/388 |
| 2,860,082 | 11/1958 | Murdock et al. | 154/110 |
| 3,038,746 | 6/1962 | Molan | 411/377 X |
| 4,422,236 | 12/1983 | Ware, Jr. et al. | 411/107 X |
| 4,753,560 | 6/1988 | Ryder | 411/82 |
| 4,948,318 | 8/1990 | Nottelmann et al. | 411/377 |
| 5,113,667 | 5/1992 | Sullivan | 411/377 X |

OTHER PUBLICATIONS

"Forward Technology Industries, Inc.", Forward Technology Industries, Inc., pp. 588001, 588008, 588009.

"Designer's Manual D3000" Black & Decker, 1989 pp. 1-5; 11, 13, 20 and 21.

*Primary Examiner*—Rodney M. Lindsey
*Attorney, Agent, or Firm*—Trexler, Bushnell, Giangiorgi & Blackstone, Ltd.

[57] ABSTRACT

A stud for ultrasonic insertion into a strip of material generally comprises a shank having a head portion and an entering portion on opposite ends thereof. The head portion is ultrasonically insertable into the strip, and the entering portion is insertable into an aperture in a workpiece. The head portion comprises a positive stop means for locating a level of insertion of the head portion into the strip. Means for providing pull out resistance is disposed on the head portion above the positive stop means, and means for providing torsional resistance is disposed on the head portion between the positive stop means and the means for providing pull out resistance. A body portion is located on the head portion above the means for providing pull out resistance. A unique method is also provided for ultrasonically inserting the stud into the strip.

22 Claims, 3 Drawing Sheets

ULTRASONIC INSERT STUD AND METHOD OF ASSEMBLY

BACKGROUND AND SUMMARY OF THE INVENTION

The present invention relates generally to a uniquely constructed stud which is ultrasonically insertable into a strip or segment of plastic material and a unique and novel method for ultrasonically inserting articles into such a strip or segment. The invention more specifically relates to a stud having a unique configured head which can be ultrasonically inserted into a strip of material to attain a pre-formed configuration comprised of a plurality of studs, and a novel method for ultrasonically inserting those studs into the strip or segment.

The inserting and embedding of a stud in a strip of plastic material is well known. For instance, the patent to Murdock et al., U.S. Pat. No. 2,860,082, discloses one way for embedding a plurality of studs in a protective body or strip. This method requires a preformed strip in which to insert the studs, and also requires the utilization of a substrate and glue-like combination in order to seal and fix the studs within the strip.

Utilization of this method may not be attractive to some because it does not allow for easy alteration of the stud configuration in the strip. To change the stud configuration, an entirely new strip must be machined, adding the significant costs of retooling. Also, the use of the substrate and glue-like combination can be messy as well as costly. Additionally, because of the multiple steps in the method, and the multiple parts in the construction, the Murdock method can be time consuming and labor intensive, thereby adding to the cost of utilization.

Alternative methods for inserting and encapsulating studs in a strip of material are available. Some of those methods produce constructions similar to that disclosed and illustrated in the patent to Egner, U.S. Pat. No. 294,676, and the patent to Ryder, U.S. Pat. No. 4,753,560. Many of these methods employ the techniques of injection or insert molding of the plastic material about the studs. These methods are quite expensive due to the high priced machinery required, and also provided some of the same, above-detailed drawbacks. For instance, to change the configuration of the studs on the strip, a new mold must be machined, resulting in high retooling costs.

The improved method of the present invention for inserting studs into a strip employs the techiques of ultrasonic welding. Ultrasonic welding is a process whereby the material composing the strip is excited by ultrasonic energy to its melting point. The melted or deformed material then flows around and engages a stud to be inserted under the influence of natural or applied forces. As the ultrasonic energy is removed, the temperature of the material recedes from its melting point, thereby returning to its solid phase, and firmly retaining the stud within the strip.

However, the utilization of ultrasonic welding by the methods of the prior art has some drawbacks, making it unattractive for some applications. Specifically, the prior art methods utilizing ultrasonic welding require a hole or other aperture of sufficient size to accept and stud to be pre-formed in the strip or segment of plastic material. Some methods require the addition of an insert into the pre-formed hole and ultrasonically welding to the aperture walls. The stud would then be inserted into the pre-formed hole. The step of pre-forming the hole makes these methods time consuming and labor intensive, leading to greater costs. Additionally, the requirement of the insert adds to the cost of utilizing these methods.

The stud and the method of ultrasonic insertion of articles into a trip or segment as provided by the present invention eliminates many of the drawbacks present in the prior art.

OBJECTS AND SUMMARY OF THE INVENTION

A general object of the preset invention is to provide a uniquely constructed improved stud for ultrasonic insertion or embedding into a strip of material by a unique method.

A more specific object of the invention is to provide a specially constructed threaded stud for ultrasonic staking into a relatively thin segment or strip of plastic material.

Another object of the present invention is to provide a method for ultrasonically inserting a stud into a strip of material which does not require a pre-formed hole in the strip.

An additional object of the invention is to provide a stud and a method for ultrasonically inserting is to provide a stud does not require a specific minimum material thickness.

Another object of the invention is to provide a method for ultrasonically inserting articles into a strip which is useful with both studs and nuts.

An additional object of the present invention is to provide a stud for ultrasonic insertion into a strip which is simpler to manufacture than other, currently available studs.

An additional object of the invention is to provide a method for inserting a stud into a strip which does not require insert molding.

A further object of the present invention is to provide studs which can be ultrasonically inserted into a strip to form a plurality of configurations.

Another object of the invention is to provide studs having a head configuration for ultrasonic insertion into a strip.

An additional object of the present invention is to provide a method for ultrasonically inserting a stud into a strip which can be used which plastic strips that are thinner than the height of the head portion to be embedded therein.

A further object of the present invention is to provide a method for constructing a pre-formed plurality of studs in a specific configuration.

A further object of the invention is to provide a stud for ultrasonic insertion into a strip having a positive stop location for the level of insertion.

Another object of the present invention is to provide a stud for ultrasonic insertion into a strip having means to direct deformed strip material flow.

A further object of the invention is to provide a method of ultrasonically inserting or embedding a stud into a strip which simplifies changing of stud spacing in the strip.

Another object of the invention is to provide a unique method for ultrasonically inserting articles into a strip of material.

A stud, constructed according to the teachings of the present invention, for ultrasonic insertion into a strip of material, generally comprises a shank having a head portion and an entering portion on opposite ends thereof. The head portion is ultrasonically insertable into the strip, and the entering portion is insertable into an aperture in a workpiece. The head portion may comprise a positive stop means for locating a level of insertion of the head portion into the strip. Means for providing pull-out resistance is disposed on the head portion as is means for providing torsional resistance. A protuberance or body portion may be employed on the head portion above the means for providing pull out resistance as an energy director to facilitate embedding of the head portion in the plastic material. This protuberance or body portion is preferably conical.

A method, preformed according to the teachings of the present invention, for ultrasonic insertion of a stud into a strip of material, generally comprises the steps of providing an ultrasonic horn engaging a side of the strip and the head portion of the stud engaging an opposite side of the strip aligned with the ultrasonic horn. The ultrasonic horn is energized, thereby deforming the material of the strip proximate to the head portion which may include a protuberance or body portion. The ultrasonic horn is moved towards the stud so that deformed portions of the strip flow around the head portion. The strip then engages projections on the head of the stud below the body portion. The ultrasonic horn not only brings the plastic material to a melting point, but also serves as a mold to form the material of the strip proximate to the projections into a designated configuration. The ultrasonic horn is moved towards the stud until the head is encapsulated in the material of the strip or segment. The method of the present invention may also be successfully employed with other types of articles to be inserted ultrasonically into a strip of plastic material.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which.

DETAILED DESCRIPTION OF A PREFERRED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

While the stud to be described is particularly adapted for ultrasonic insertion into a strip, it is to be understood that the stud can be used in other employments as well. Also, while the method for ultrasonic insertion will be described with relation to the insertion of a stud into a strip, it is to be understood that the method may be utilized with other articles for ultrasonic insertion into things other than a strip. The scope of this patent is to be broad enough to encompass all of those alternatives, among others.

Figure 1:
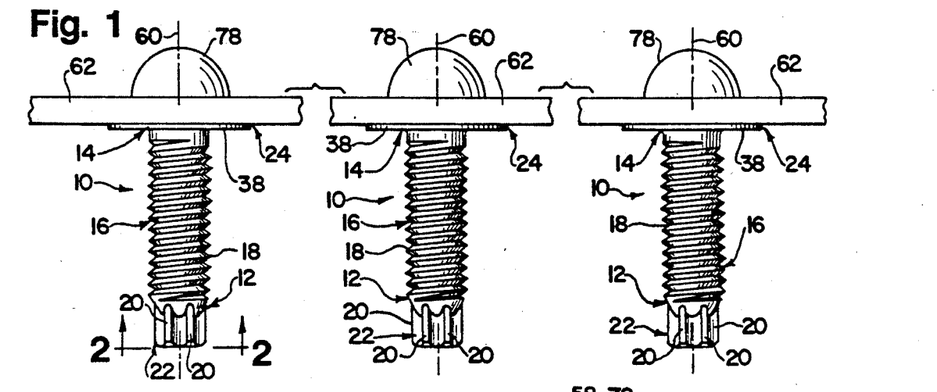
FIG. 1 is a side elevational view of a strip of material having a plurality of ultrasonically inserted studs embedded therein, constructed according to the teachings of the present invention.
Figure 5:
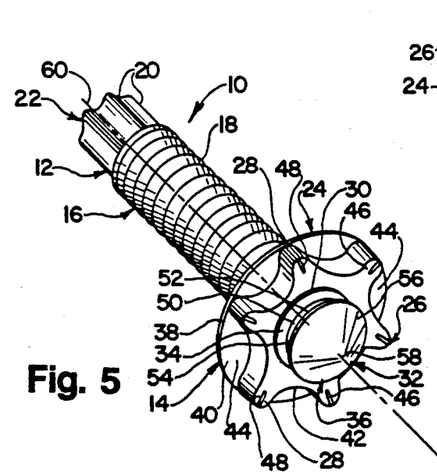
FIG. 5 is a perspective view of the stud, constructed according to the teachings of the present invention, specifically configured for ultrasonic insertion into the strip.

Referring initially to FIG. 1, a series of studs 10, in accordance with the present invention, are shown embedded or affixed to a strip or segment 62 of plastic material. With reference to FIG. 5, the structure and construction of the fastener, insert, or stud 10 will be discussed. The stud 10 has an entering or work engaging portion 12 and a head portion 14 on opposite ends of a body portion or shank 16. The shank 16 is substantially cylindrical in shape, and extends from the entering portion 12 to the head portion 14. The stud 10 is composed of a hard, strong material, such as steel and the like, to insure its strength.

In the illustrated embodiment, the shank 16 has an external thread 18 thereon, the configuration of which depends upon the particular employment to be fulfilled by the stud 10. An internally threaded portion could be provided, if desired. In a preferred construction, the thread 18 terminates a certain distance away from the entering portion 12.

The distance between the termination of the thread 18 and the entering portion 12 is occupied by a plurality of projections or lobes 20, which assist in resisting torsional forces applied to the stud 10 when a nut is applied to the threaded portion 18. The particular configuration of the lobes 20 illustrated in the FIGS. is commonly referred to as the TORX ® configuration, and is disclosed in the patent of Reiland, U.S. Pat. No. 3,584,667, assigned to the assignee of the present invention. The disclosure of that patent is incorporated herein by this reference. The distance between the termination of the thread 18 and the entering portion 12 thus comprises a multilobular shank portion 22.

A plurality of elements or features make up the head portion 14. Specifically, the head portion 14 preferably comprises means 26 for providing torsional resistance in the form of a plurality of projections or lobes 28 forming a multilobular portion, and a leading end portion including a lip 30, means 32 for providing pull out resistance in the form of a retaining groove 34. In addition, the head portion 14 may include a body portion 36 and positive stop means 24. The body portion 36 may be conically shaped, as in the preferred embodiment illustrated in the FIGS., semispherically shaped, or shaped in another configuration. Those elements are disposed Those elements are disposed on the head portion 14 extending from the shank 16 in the above-disclosed order. However, other orderings are possible depending upon the particular utilization of the stud 10.

The stop means 24 is not a necessary element of the stud 10, for its functions can be performed suitably by a fixture 64, as will become apparent hereinafter. However, it is to be noted that in use, the positive stop member 24 increases the effective bearing surface area allowing clamp loads to be dispersed over a larger portion of a workpiece to which the stud 10 is applied. This results in less possible mechanical stress-induced damage of the workpiece. Also, a larger bearing surface area allows for a larger clearance hole in the workpiece or for greater misalignment without a corresponding reduction in clamp performance. With a larger bearing surface area, a greater portion of tightening torque is absorbed by the stud 10 and the workpiece by means of friction forces, and is not transmitted to the strip 62. This aspect is of prime importance in the embodiment of the invention depicted in FIG. 13.

The positive stop means 24 is in the form of web means between the lobes 28 and has an underside 38 and a top side 40. As clearly illustrated in FIG. 5 and FIG. 6, the shank 16 is connected to the head portion 14 at the underside 38 of the positive stop means 24. Thus, the positive stop means 24 defines the demarcation between the head portion 14 and the shank 16. The positive stop means 24 is preferably substantially planar and disk shaped, and defines the largest diameter of the head portion 14. It is to be noted, however, that the stop means 24 can take on a number of different shapes, such as a hexagon. The stop means 24 extends substantially perpendicularly away from an outer surface of the shank 16, and the underside 38 is substantially smooth and flat, although this is not necessary. The top side 40 of the stop means 24 engages and supports the means for providing torsional resistance 26.

Figure 3:
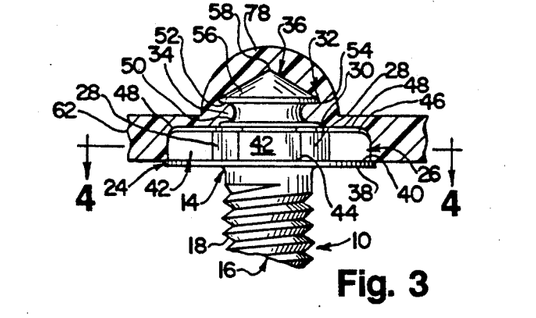
FIG. 3 is an enlarged vertical sectional view of a head of one stud ultrasonically inserted into the strip, showing the encapsulating thereof.
Figure 6:
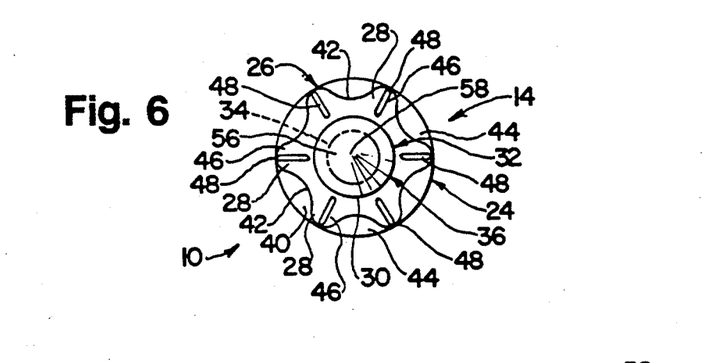
FIG. 6 is a top plan view of the bolt illustrated in FIG. 5.

As shown in FIG. 3 and FIG. 6, the lobes 28 comprise the means 26 for providing torsional resistance, and these lobes are disposed on the top side 40 of the stop means 24. The lobes 28 extend along the top side 40 of substantially along the entire diameter of the top side 40. However, the lobes 28 do not cover the entire surface of the top side 40, as spaces 42 exist between successive lobes 28 which expose portions of the top side 40 in the form of webs 44. The functionality of the webs 44 and the means for providing torsional resistance 26 will become more clear herein.

The lobes 28 project upwardly from and substantially perpendicularly to the top side 40 of the positive stop means 24. The preferred configuration of the lobes 28 illustrated in the FIGS. is commonly referred to as the TORX ® configuration, which is substantially similar to the preferred configuration of the lobes 20 on the multilobular shank portion 22. As will be discussed further herein, the lobes 28 cooperate with the spaces 42 to provide means 26 into which the plastic material can flow to provide an interlock and torsional resistance.

Each of the lobes 28 has a substantially planar top surface 46, and the lobes 28 collectively make the top surface 46 continuous among the lobes 28. However, it is to be noted that the top surfaces 46 can be concave or convex, or any other desired configuration. Situated concentrically on the top surface 46 is the lip 30. The lip 30 extends upwardly and substantially perpendicularly away from the top surface 46. The lip 30 has a substantially circular outer periphery having a diameter smaller than corresponding diameters defined by ends of opposite lobes 28 and defined by inner edges of opposite spaces 42. It is to be understood that the lip 30 is not a functional element of the stud 10, any may be eliminated if desired.

Additionally, each lobe 28 may have an energy director 48 associated therewith. The energy directors 48 extend along the top surface 46 of each lobe 28 from an outer end of the lobe 28 towards the lip 30. The energy directors 48 project upwardly from the top surface 46 along each lobe 28. The energy directors 48 are capable of concentrating and focusing ultrasonic energy, thereby causing rapid heat build-up, and also comprise deformed material directing means which serves to direct the path of flow of deformed strip material, as will be discussed herein with relation to the disclosure of the method for ultrasonic insertion.

A projection 50 rises concentrically from the lip 30 a certain distance. The diameter of the projection 50 is smaller than the diameter of the lip 30. The projection 50 is substantially cylindrical in shape. An end of the projection 50 opposite to an end thereof connected to the lip 30 supports the substantially conical body portion 36. The projection 50 also includes the annular groove 34.

The body portion 36 is concentric with the projection 50, and all of the other elements comprising the head portion 14. The body portion 36 comprises a bottom side 52, an edge portion 54, and a sloped portion 56 terminating at an apex 58.

In this manner, the lip 30 and the bottom side 52 create means 32 for resisting pull out in the form of a retaining groove 34, which extends from the diameter defined by the lip 30 to the outer surface of the projection 50. The groove 34 extends along the entire length of the projection 50 between the lip 30 and the bottom side 52.

The edge portion 54 extends upwardly away from the bottom side 52 in a substantially perpendicular fashion in a preferred embodiment, however, the edge portion 54 can be radiused if desired. The sloped portion 56 is displaced above the bottom side 52 a certain distance defined by the edge portion 54. Accordingly, the edge portion 54 connects the sloped portion 56 to the bottom side 52. The sloped portion 56 inclines upwardly from the edge portion 54 towards a longitudinal center line 60 of the stud 10. The sloped portion 56 terminates at the apex 58. The apex 58 performs as another energy director 48, as will be described herein. It is to be noted that the shape of the energy directors 48 is not critical to their functionality. But, the energy directors 48 need to have an initial contact point smaller in area than the rest of their supporting structures, that is, the lobes 28 and the body 36.

The above-described structure of the stud 10 is particularly adapted to ultrasonic insertion into a strip of material. The energy directors 48 serve to focus ultrasonic vibrations, thereby causing the material of the strip to deform, and provide direction for the deformed material, guiding it into the spaces 42 above the webs 44, and also around the sloped portion 56 and into the retaining groove 34, thereby encapsulating the head portion 14 of the stud 10 within the strip. Furthermore, the stud 10 structure is simpler and less expensive to manufacture. For instance, only one threading pass is needed to roll on specific elements of the stud 10.

It is to be noted that the head portion 14 comprises four basic elements: a positive stop member 24, means for providing torsional resistance 26, means for providing pullout resistance, and an energy director 48. While the structure of the head portion 14 has been disclosed with relation to a particular order of sequence of these elements in mind, it is to be clearly understood that these elements can be subjected to different orders of sequence without departing from the scope of this invention.

With the structure of the stud 10 disclosed, the method by which the stud 10 is ultrasonically inserted into a strip 62 of material is described in the following paragraphs. Although the method is illustrated and described with relation to the ultrasonic insertion of studs 10 into a strip 62, it is to be understood that the method can be utilized with other articles, and with differently configured pieces of material. It is also to be noted that the functional benefits attendant with the particular construction and configuration of the stud 10 will become apparent in the discussion of the method of the present invention.

Figure 7:
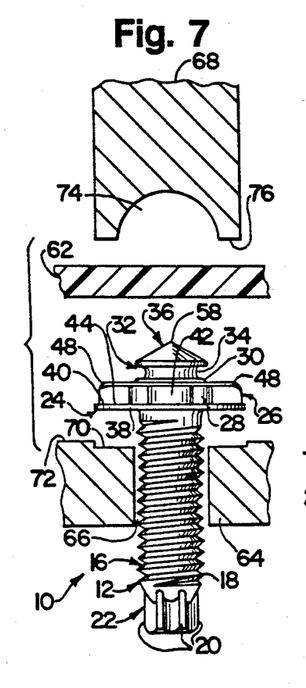
FIG. 7 is an elevational view of a stud releasably retained in a fixture about to be ultrasonically inserted into the strip.

The method of ultrasonically inserting a stud 10 into a strip 62 will be discussed with sequential reference to FIG. 7 through FIG. 12. As illustrated in FIG. 7, there are four principle components in the method, namely a fixture 64 having a bore 66, the stud 10, the strip 62, and an appropriately configured ultrasonic horn 68. The bore 66 is of sufficient diameter to accept the shank 16 of the stud 10. The fixture 64 also may have a relieved area 70 centered about the bore 66. The relieved area 70 is of sufficient size to accept the major diameter of the head portion 14.

The strip 62 is composed of a deformable material, such as plastic, and the like, having a pre-determined melting point. The strip 62 may be of any suitable thickness because the method of the present invention does not require a specific minimum thickness of the strip 62, as opposed to the methods of the prior art. The strip 62 may be of any desired configuration, and the studs 10 may also be ultrasonically inserted into the strip 62 in any desired configuration. In some applications of the method, the strip 62 may come immediately from an extruder, although this is not necessary.

The ultrasonic horn 68 is acoustically connected to a power source (not shown for clarity), the construction and operation of which is well known in the relevant art of ultrasonic acoustic vibrations. The horn 68 has a substantially concavely arcuate shaped mouth, cavity or recess 74 on an end thereof opposite to the end connected to the source, not shown for clarity. The horn 68 is constructed so as to columnate the ultrasonic vibrations towards a lateral member 76.

The volume encompassed by the mouth 74 is sized to be equal to the volume of the deformed material displaced by the insertion of the stud 10 into the strip 62. The mouth 74 is bounded by the lateral member 76 which extends from the periphery of the mouth 74 to the outer periphery of the horn 68.

While the lateral member 76 is depicted in the FIGS. as being substantially planar, it is to be noted that ridges or cross-hatching can be disposed on the lateral member 76 to assist in the control of flashing of the strip 62. As will become clearer herein, the mouth 74 is particularly configured so as to assist in the insertion and encapsulation of the head portion 14 of the stud 10 into the strip 62. Accordingly, the mouth 74 is of sufficient dimension to accept the body 36.

To ultrasonically insert the stud 10, or any other article for that matter, into the strip 62, or other configuration of material, the shank 16 of the stud 10 is inserted into the bore 66 in the fixture 64. Upon proper insertion into the bore 66, the underside 38 of the head 14 confronts and is supported by the relieved area 70 on the fixture 64. In this manner, the fixture 64 supports and releasably holds the stud 10 within the bore 10 so that the stud 10 can resist the influence of any downwardly directed forces applied to the stud 10. The head portion 14 of the stud 10 remains exposed above the fixture 64, as illustrated in FIG. 7.

As the ultrasonic insertion method begins, the stud 10 is located within the bore 66, and the horn 68 is located above the head portion 14 a certain distance. The strip 62, or a portion thereof, is disposed between the head portion 14 and the horn 68. The horn 68 is oriented so that the mouth or cavity 74 opposes the strip 62 and the head portion 14.

Figure 8:
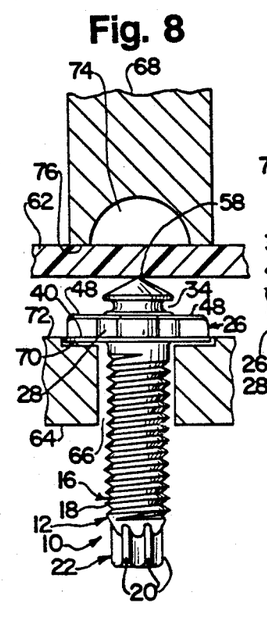
FIG. 8 is a view similar to that of FIG. 7 of the method of ultrasonically inserting a stud into the strip, showing the ultrasonic welder engaging the strip and the strip engaging the tip of the head of the stud.

The method continues, as shown in FIG. 8. The horn 68 is moved downwardly towards the fixture 64 so that the lateral member 76 of the horn 68 confronts and engages the strip 62 along one side thereof. The horn 68 continues to move downwardly until the strip 62 engages the apex 58 of the body portion 36 on the head portion 14. At this time, or just prior, the power source is energized, thereby producing ultrasonic vibrations which are directed along the horn 68 and to the lateral member 76. Because the lateral member 76 is in contact with the strip 62, the ultrasonic vibrations can soften or melt the material comprising the strip 62.

The energy director formed by the apex 58 of the body portion 36 focuses the ultrasonic vibrations at a portion of the strip 62 which is in engagement with the apex 58. In this way, the energy director at the apex 58 causes rapid heat buildup in the portion of the strip 62 confronting it. Thus, the temperature of the material of the strip 62 in that portion reaches its melting point before the remainder of the strip 62.

Figure 9:
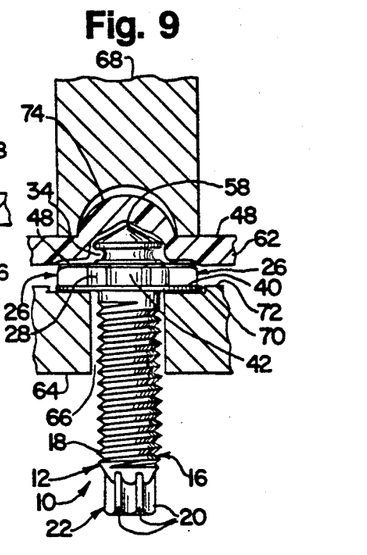
FIG. 9 is a view similar to that of FIG. 8 showing the ultrasonic welder deforming the strip around the tip of the stud, and the engaging the stud lobes.

The portion deforms, and the energy director at the apex 58 and the sloped portion 56 of the body portion 36 directs the deformed material around the body 36 downwardly towards the retaining groove 34 and the lobes 28. As the deformed material flows, the horn 68 is moved downwardly further, thereby assisting in the direction of deformed material flow and bringing portions of the strip 62 into contact with the top surface 46 of the lobes 28, as shown in FIG. 9.

Figures 10, 11:
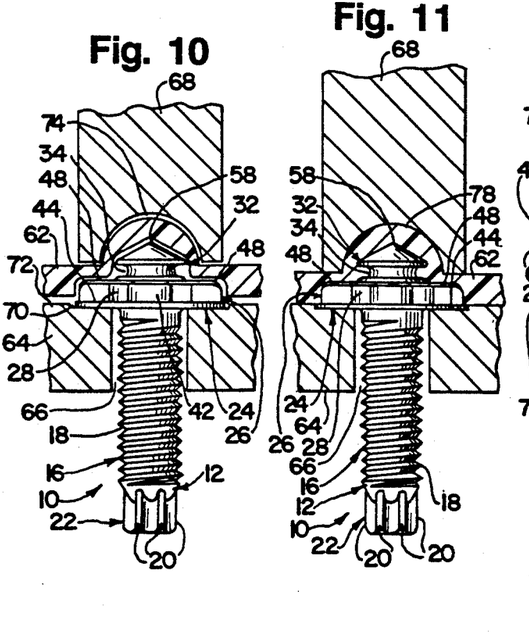
FIG. 10 is a view similar to that of FIG. 9 showing the ultrasonic welder deforming the strip around the stud lobes.
FIG. 11 is a view similar to that of FIG. 10 showing the strip being deformed into the configuration of the stud head.

As the strip 62 contacts the top surface 46, it also contacts the energy directors 48 on each of the lobes 28, as illustrated in FIG. 10. The energy directors 48 function substantially similarly to the energy director formed by the apex 58, directing and concentrating the ultrasonic vibrations to cause rapid heat build-up. Due to the function of the energy directors 48, the portions of the strip 62 contacting them deform. The energy directors 48 channel and direct the deformed material of the strip 62 into the retaining groove 34, and into the spaces 42 between adjacent lobes 28.

As illustrated in FIG. 11, the horn 68 is moved downwardly still further until the strip 62 engages the surface 72 of the fixture 64. The deformed material of the strip 62 flows around the head portion 14 until it substantially fills the retaining groove 34 from the outer surface of the projection 50 to the edge portion 54 of the body portion 36, and also fills the spaces 42 between adjacent lobes 28 from the webs 44 to the top surface 46 of the lobes 28. The positive stop portion 24 prohibits and limits the flow of deformed material.

Thus, the head portion 14 of the stud 10 is ultrasonically inserted or embedded and substantially encapsulated by the strip 62. The mouth or cavity 74 of the horn 68 also serves to direct the flow of the deformed material of the strip 62. The mouth 74 encourages the deformed material to fill it, thereby forming a dimple 78 protruding substantially convexly from one side of the strip 62. The dimple 78 effectively coats and cushions the head portion 14 of the stud 10. Of importance here is the fact that the head portion 14 has been embedded into a relatively thin strip 62, that is a strip that has a thickness significantly less than the height of the head portion 14. Also, the cavity 74 functions as a mold or die to form the material of the strip into a dimple 78 of predetermined configuration corresponding to the configuration of the cavity 74 to encapsulate the head 14.

Figure 2:
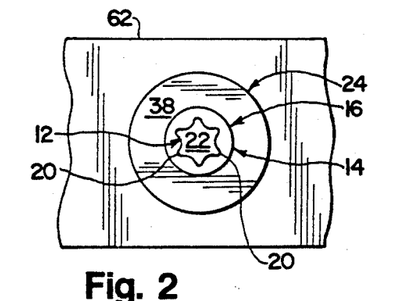
FIG. 2 is a bottom plan view of a portion of the strip illustrated in FIG. 1 retaining one stud.
Figure 12:
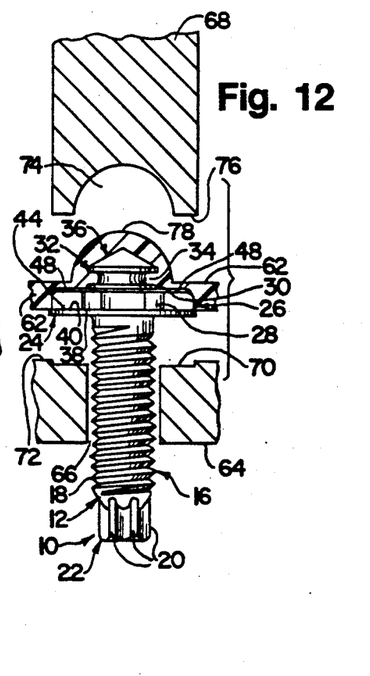
FIG. 12 is a view similar to that of FIG. 11 showing the ultrasonic insertion method completed, the stud inserted into the strip, and the stud removed from the fixture.

Once the head portion 14 is completely encapsulated, and the dimple 78 is properly formed, the source of ultrasonic vibration is switched off, and the horn 68 is retracted, as shown in FIG. 12. The material of the strip 62 quickly cools, thereby firmly retaining the ultrasonically inserted stud 10. The shank 16 of the stud 10 is now fixed to the strip 62 and can be removed from the bore 66 in the fixture 64. The head portion 14 only is encapsulated. The positive stop means 24 prevents any plastic material from flowing beyond it, as shown in FIG. 2. In this manner, the deformed material is prohibited from affecting the threads 18 on the shank 16.

This ultrasonic insertion method can be repeated as often as necessary, and upon any desired position on the strip 62, to form the product depicted in FIG. 1, or any other configuration of studs with a plastic strip or segment. The strip 62 may now be cut into any desired form.

Figure 13:
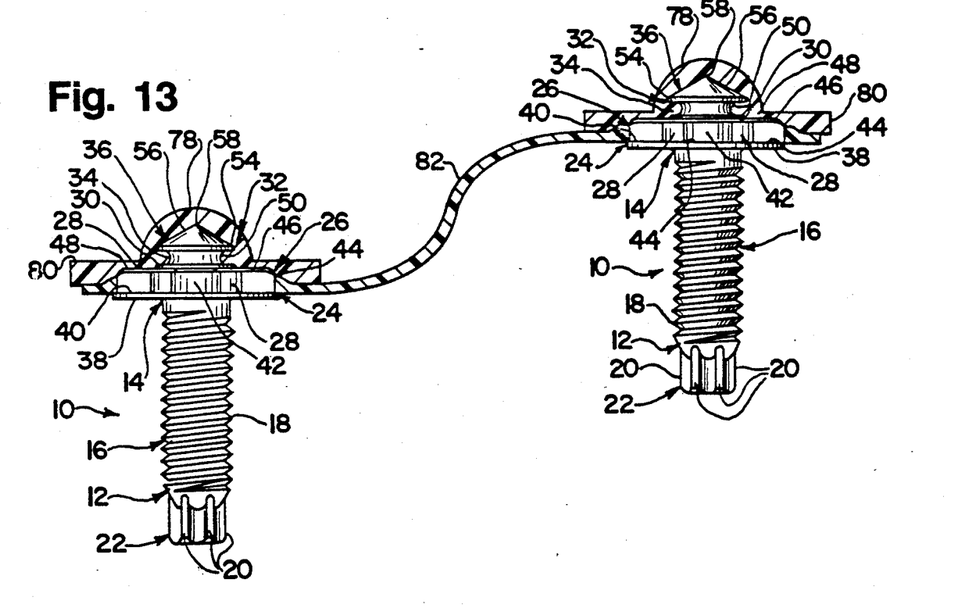
FIG. 13 is a partially sectioned elevational view of a strip of material retaining a plurality of ultrasonically inserted studs joined ultrasonically to another strip of flexible material showing the particular construction thereof.

In another embodiment of the invention, illustrated in FIG. 13, the strip 62 is cut into discrete pieces 80 before the ultrasonic insertion of the stud 10, or other article. The pieces 80 are of sufficient dimensions to affectuate proper ultrasonic insertion, as described above. However, before the ultrasonic insertion method is executed, a thinner, flexible member 82, composed of a thin, flexible plastic material and the like, is disposed between a piece 80 and the apex 58 of the body portion 36 of the stud 10. The flexible member 82 can be thinner than the thread diameter of the stud 10. It is to be noted, however, that the piece 80 can be disposed between the member 82 and the apex 58, without departing from the scope of the invention.

The ultrasonic insertion method is executed as described above, but now, instead of the stud 10 being inserted into the piece 80 only, the stud 10 is ultrasonically inserted into both the flexible member 82 and the piece 80. This results in a two-ply insertion construction. The same insertion method is executed at an opposite end of the flexible member 82 with another stud 10. Thus, the two ultrasonically inserted studs 10 are firmly retained by the relatively thickly constructed, strong pieces 80, as described above, and are connected to each other by the flexible member 82. It is to be noted that if the material into which the stud 10, or other body, is ultrasonically inserted is sufficiently thick or hard, a dimple may be provided in the material at the point where the energy director 48 contacts the material to facilitate ultrasonic deformation of the material.

The strip 62 of the first disclosed embodiment which connected successive studs 10 is of a relatively thick construction substantially similar to the construction of the pieces 80, and thus was not easily flexible. Oppositely, the successive studs 10 of the second embodiment are connected by the flexible member 82. Each embodiment is particularly useful in different employments. For instance, the first embodiment is desirable for applications involving consistently precise locations for studs 10, thereby allowing a workman to align all of the studs 10 with appropriate bores in a workpiece by merely aligning one of the studs 10. The second embodiment is desirable for applications involving stud bores disposed on a workpiece which are not constantly precisely located. The flexible member 82 would allow for misalignment tolerance.

Figure 4:
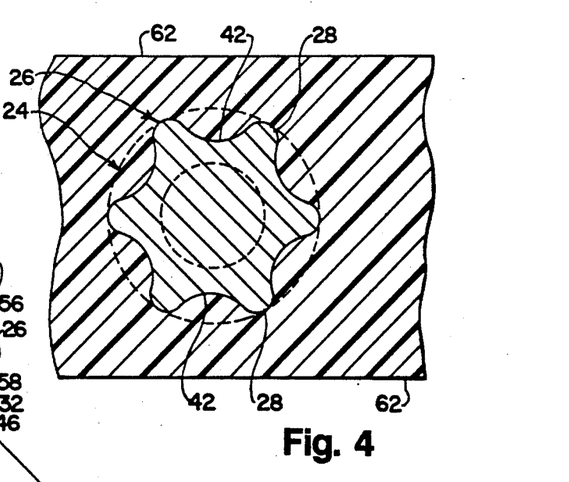
FIG. 4 is an enlarged horizontal sectional view taken along line 4—4 of FIG. 3.

The particular encapsulation of the head portion 14 of the stud 10 into the strip 62 or the piece 80 is illustrated in FIG. 3 and FIG. 4. The final construction of the means 32 providing pull out resistance is shown in FIG. 3. The material of the strip 62 has fully encapsulated the head portion 14. The deformed material has been directed or channeled into the retaining groove 34, filling it entirely, by the energy directors 48 and the sloped portion 56. Thus, the strip 62 effectively extends underneath the body portion 36. When a properly directed force, which could pull the head portion 14 out of the strip 62 is applied to the stud 10, that force acts on the bottom side 52 of the body 36. The resistance between the bottom side 52 and the portions of the strip 62 disposed underneath it serve to resist the effects of the pull out force, and maintain the stud 10 firmly within the strip 62.

The final construction of the means 26 providing torsional resistance is shown in FIG. 4. The deformed material of the strip 62 has been directed or channeled into the spaces 42 between the webs 44 and the top surface 46 of the lobes 28, filling them entirely. The strip 62 effectively extends into each of the spaces 42.

When a torsional force is applied to the stud 10 which could cause the stud 10 to rotate within the strip 62, the interference between the lobes 28 and the portions of the strip 62 disposed within the spaces 42 prevents the head portion 14, and thereby the stud 10, from rotating within the strip 62. The means 26 thus allows a workman, after insertion of the ultrasonically inserted studs 10 into appropriate bores in a workpiece, to run nuts, or other fasteners, onto the studs 10 without having to hold the head portion 14 to prevent conjoint rotation of the stud 10.

Figure 14:
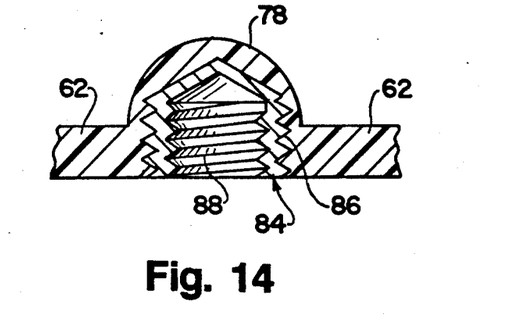
FIG. 14 is a partially sectioned elevational view of a threaded nut ultrasonically inserted into a strip of material.

Yet another embodiment of the present invention is depicted in FIG. 14. In this embodiment, a nut 84 is ultrasonically inserted, by the same above-disclosed method, into a strip 62. The nut 84 has a polygonal outer periphery 86 whose respective sides perform substantially the same function as the lobes 28 of the stud 10, namely providing means 26 providing torsional resistance. The nut 84 has threads 88 internally disposed so that studs 10, or other fasteners, can be threadably inserted therein. This embodiment allows a workman to position a plurality of nuts 84 by merely aligning one thereof adjacent to appropriate bores in a workpiece, thereby freeing his hands to run studs 10 through the bores and into the nuts 84.

The embodiments of the present invention are particularly useful in a number of employments. They can be used extensively in mass production manufacture of automobiles, or other devices where multiple fasteners or other components are used. The invention is also useful for producing weatherproofed studs and nuts. Additionally, the invention can provide a stud 10 having an encapsulated head, which is particularly desirable for employment as a leveling device, where it is not desirable to have a metal stud head engaging the floor. Further, as stated above with regard to the means 26, portions of the strip 62 are disposed in spaces 42 on the head portion 14. This means that the stud 10 is not only ultrasonically inserted into the strip 62, but is also ultrasonically staked within the strip 62. These aspects render the stud 10 and the method for its ultrasonic insertion a significant advancement over the studs and methods of the prior art.

While preferred embodiments of the present invention are shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A stud for ultrasonic insertion into a strip of plastic material, the stud comprising a body portion defining a head portion adapted for ultrasonic insertion into the strip, and a threaded portion for use in attaining clamping engagement with a workpiece; the head portion comprising: a multilobular portion for providing torsional resistance when inserted in the strip; a leading end portion extending from the multilobular portion and in a direction away from the threaded portion; and the leading end portion including: a retaining groove into which strip material will flow upon insertion of the head portion into the strip to resist axial pull out of the head portion.

2. A stud as defined in claim 1 further including an energy director disposed on the head portion to initiate deformation of the strip preparatory to insertion of the head portion therein.

3. A stud as defined in claim 1 further including a body portion on the leading end portion of the head portion which initially engages the strip and defines an apex which functions as an energy director to initiate deformation of the strip preparatory to insertion of the head portion therein.

4. A stud as defined in claim 1 further including positive top means disposed on the head portion.

5. A stud as defined in claim 1 further including webs disposed on the head portion between adjacent lobes of the multilobular portion.

6. A stud as defined in claim 1 wherein the multilobular portion is hexlobular in configuration.

7. A stud as defined in claim 1 wherein the multilobular portion is comprised of a plurality of lobes, and energy director means is disposed on at least one of the lobes.

8. A stud as defined in claim 1 further comprising deformed material directing means disposed on the head portion for channeling deformed strip material upon insertion of the stud into the strip.

9. A stud as defined in claim 1 further comprising a multilobular shank portion on an end of the body portion opposite to the head portion.

10. A stud as defined in claim 9 wherein the multilobular hank portion is hexlobular in configuration.

11. A stud as defined in claim 4 wherein the multilobular portion is disposed on the positive stop means.

12. A stud as defined in claim 3 wherein the multilobular portion defines a top surface, and the body portion is disposed above the top surface a certain distance defined by a support member which connects the body to the top surface.

13. A stud as defined in claim 1 wherein spaces are located between adjacent lobes comprising the multilobular portion for accepting deformed strip material.

14. A stud for insertion into a strip of material comprising: a shank having a head portion on one end thereof and a work engaging portion on the opposite end thereof; the head portion being insertable into the strip, and the work engaging portion being receivable in a bore in a workpiece; the head portion comprising a positive stop means for locating a level of insertion of the head portion into the strip; means for providing pull out resistance disposed on the head portion above the positive stop means; means for providing torsional resistance disposed on a leading end of the head portion between the positive stop means and the means for providing pull out resistance; and a substantially conically shaped body portion disposed on the head portion above the means for providing pull out resistance.

15. A stud as defined in claim 14 further comprising an energy director disposed on the substantially conically shaped body portion for initiating deformation of the strip.

16. A stud as defined in claim 14 wherein the means for providing torsional resistance comprises a plurality of lobes disposed on the positive stop means, and spaces disposed between adjacent lobes for receiving deformed strip material.

17. A stud as defined in claim 16 further comprising energy directors disposed on at least one of the lobes for initiating deformation of the strip.

18. A stud as defined in claim 14 further comprising deformed material directing means disposed on the head portion for directing deformed strip material towards both of the mentioned means.

19. A stud as defined in claim 14 wherein the means for providing pull out resistance comprises a retaining groove disposed between the positive stop means and the substantially conically shaped body portion, and the means for providing pull out resistance capable of accepting deformed strip material.

20. A stud as defined in claim 16 wherein the lobes are disposed on the head portion in a hexlobular configuration.

21. A metal insert for ultrasonic insertion into a strip of plastic material, the insert comprising a body portion defining a head portion adapted for ultrasonic insertion into the strip, and a threaded portion for use in attaining clamping engagement with a workpiece; the head portion comprising: a body which initially engages the strip; an energy director disposed on the body to initiate deformation of the strip preparatory to insertion of the head portion therein; and means for resisting pull out positioned adjacent to said energy director for engaging said strip of plastic material to prevent said metal insert from being pulled out of said plastic material.

22. A metal insert as recited in claim 21, further comprising torsional resistance means disposed on said head portion between said means for resisting pull out and said threaded portion, said torsional resistance means preventing rotational of said head in said strip of plastic material to prevent said metal insert from being loosened or pulled out of said plastic material.

* * * * *

UNITED STATES PATENT AND TRADEMARK OFFICE
CERTIFICATE OF CORRECTION

PATENT NO. : 5,199,837

DATED : April 6, 1993

INVENTOR(S) : David Goss

It is certified that error appears in the above-identified patent and that said Letters Patent is hereby corrected as shown below:

Column 1, Line 64 "accept and" should be — accept the —

Column 2, Line 7 "trip" should — strip —

Column 2, Line 27 "is to provide a stud" should be —it into a strip which —

Column 2, Line 44 "having a head" should be — having a multilobular head —

Column 4, Line 3 "the engaging" should be — the strip engaging—

Column 12, Line 9 "hank" should be —shank —

Column 14, Line 2 "rotational" should be — rotation —

Signed and Sealed this

Fifteenth Day of February, 1994

*Attest:*

BRUCE LEHMAN

*Attesting Officer*   Commissioner of Patents and Trademarks